(No Model.) 7 Sheets—Sheet 1.
K. L. COMES & S. T. NEWMAN.
HAT CURLING MACHINE.

No. 565,154. Patented Aug. 4, 1896.

WITNESSES
H. A. Lamb
Pearl Reynolds

INVENTORS
Keros Lester Comes
and Samuel T. Newman
By A. M. Wooster
Atty.

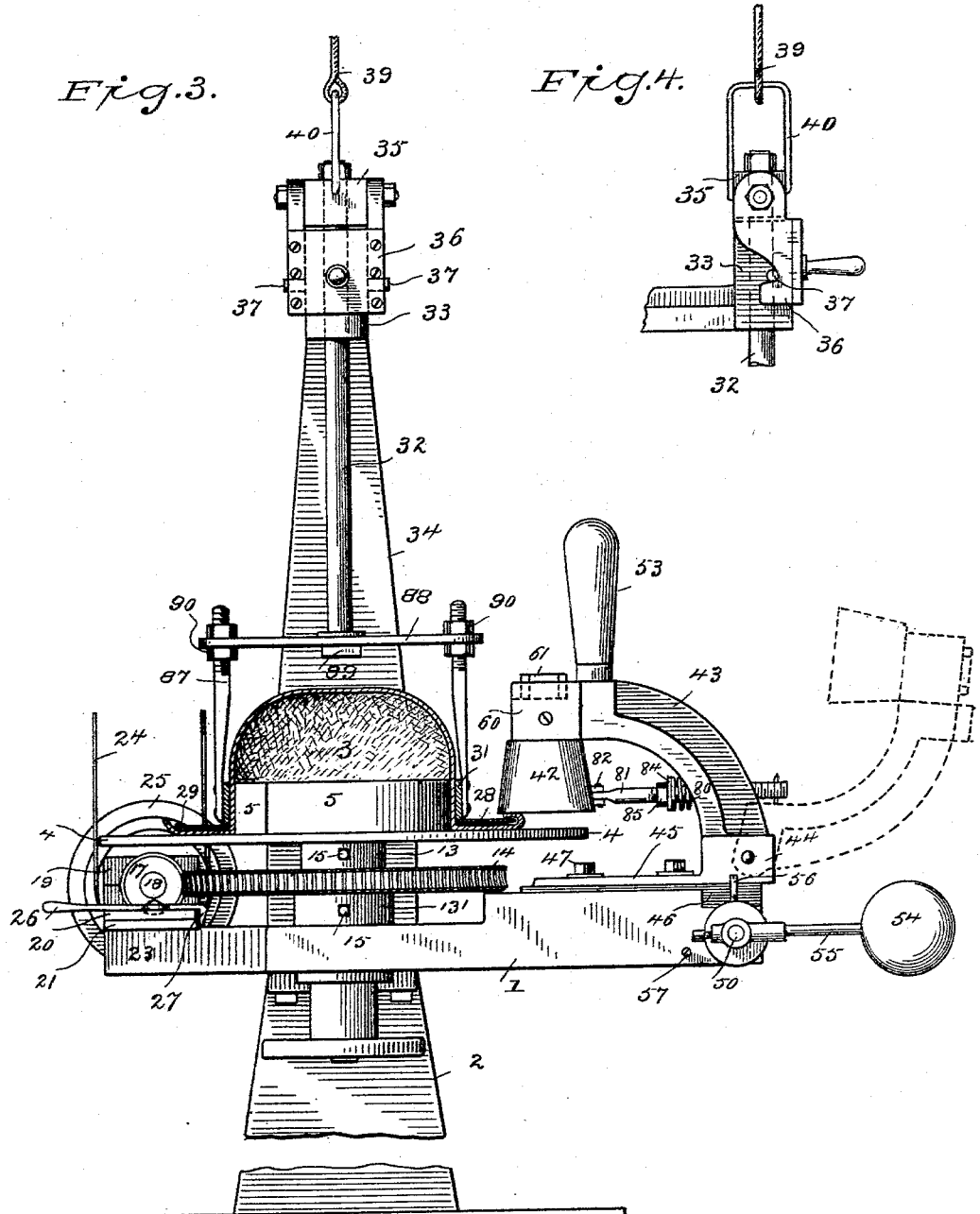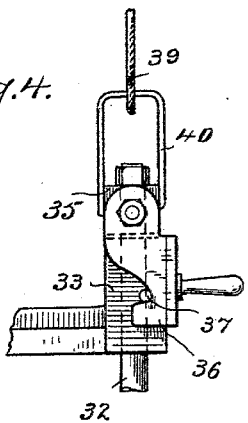

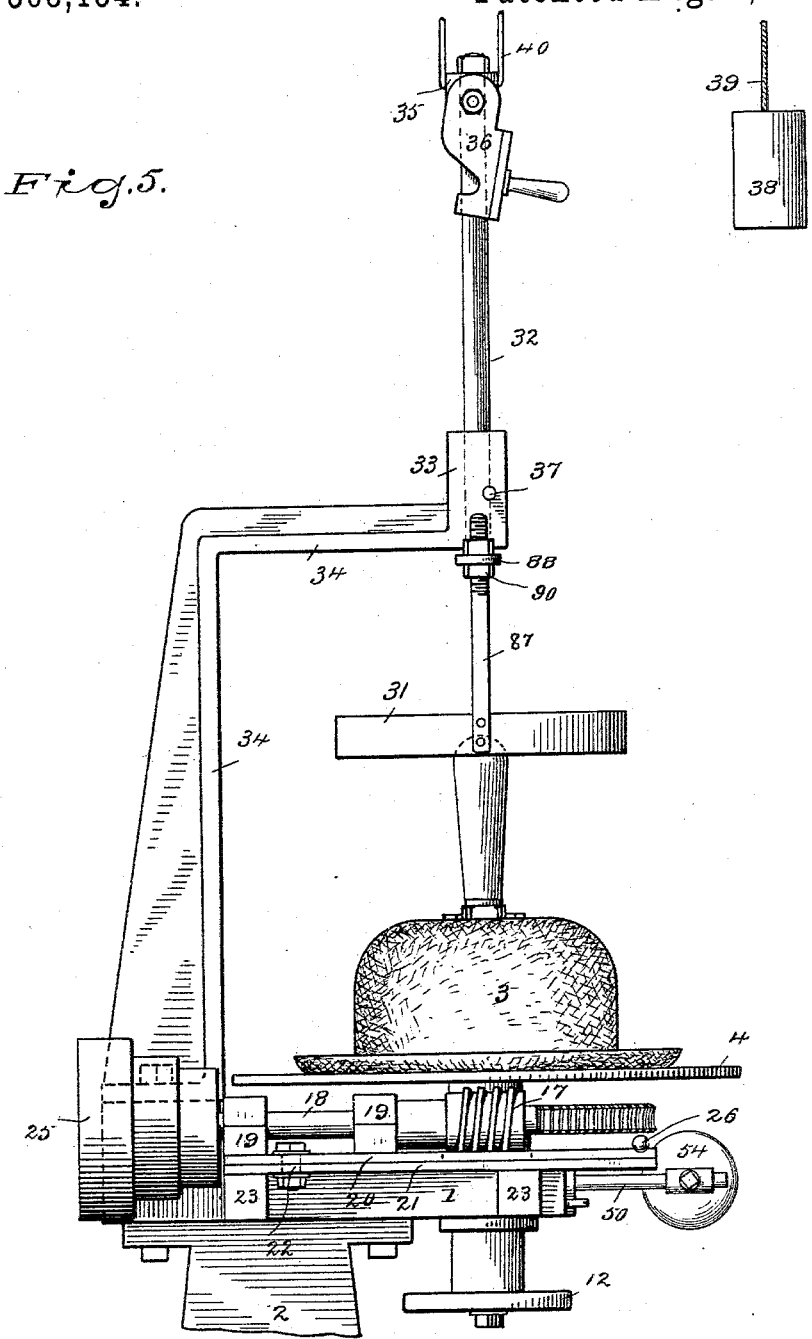

(No Model.) 7 Sheets—Sheet 4.

K. L. COMES & S. T. NEWMAN.
HAT CURLING MACHINE.

No. 565,154. Patented Aug. 4, 1896.

WITNESSES
H. A. Lamb
Pearl Reynolds

INVENTORS
Keros Lester Comes
Samuel T. Newman
By A. M. Wooster
Atty.

(No Model.) 7 Sheets—Sheet 5.
K. L. COMES & S. T. NEWMAN.
HAT CURLING MACHINE.

No. 565,154. Patented Aug. 4, 1896.

WITNESSES
H. A. Lamb
Pearl Reynolds

INVENTORS
Keros Lester Comes
and Samuel T. Newman
By A. M. Wooster
Atty.

(No Model.) 7 Sheets—Sheet 6.
K. L. COMES & S. T. NEWMAN.
HAT CURLING MACHINE.

No. 565,154. Patented Aug. 4, 1896.

WITNESSES
H. A. Lamb
Pearl Reynolds

INVENTORS
Keros Lester Comes
Samuel T. Newman
By A. M. Wooster
Atty.

(No Model.) 7 Sheets—Sheet 7.

K. L. COMES & S. T. NEWMAN.
HAT CURLING MACHINE.

No. 565,154. Patented Aug. 4, 1896.

WITNESSES
H. A. Lamb
S. V. Richardson.

INVENTORS:
Keros Lester Comes
Samuel T. Newman
By J. M. Wooster Atty.

THE NORRIS PETERS CO., PHOTO-LITHO., WASHINGTON, D. C.

UNITED STATES PATENT OFFICE.

KEROS LESTER COMES AND SAMUEL T. NEWMAN, OF DANBURY, CONNECTICUT.

HAT-CURLING MACHINE.

SPECIFICATION forming part of Letters Patent No. 565,154, dated August 4, 1896.

Application filed November 1, 1893. Serial No. 489,756. (No model.)

*To all whom it may concern:*

Be it known that we, KEROS LESTER COMES and SAMUEL T. NEWMAN, citizens of the United States, residing at Danbury, in the county of Fairfield and State of Connecticut, have invented certain new and useful Improvements in Hat-Curling Machines; and we do hereby declare the following to be a full, clear, and exact description of the invention, such as will enable others skilled in the art to which it appertains to make and use the same.

Our invention has for its object to produce a simple, inexpensive, and thoroughly practical machine for curling the brims of hats.

With these ends in view we have devised the novel machine which we will now describe, referring by numbers to the accompanying drawings, forming part of this specification, in which—

Figure 1:
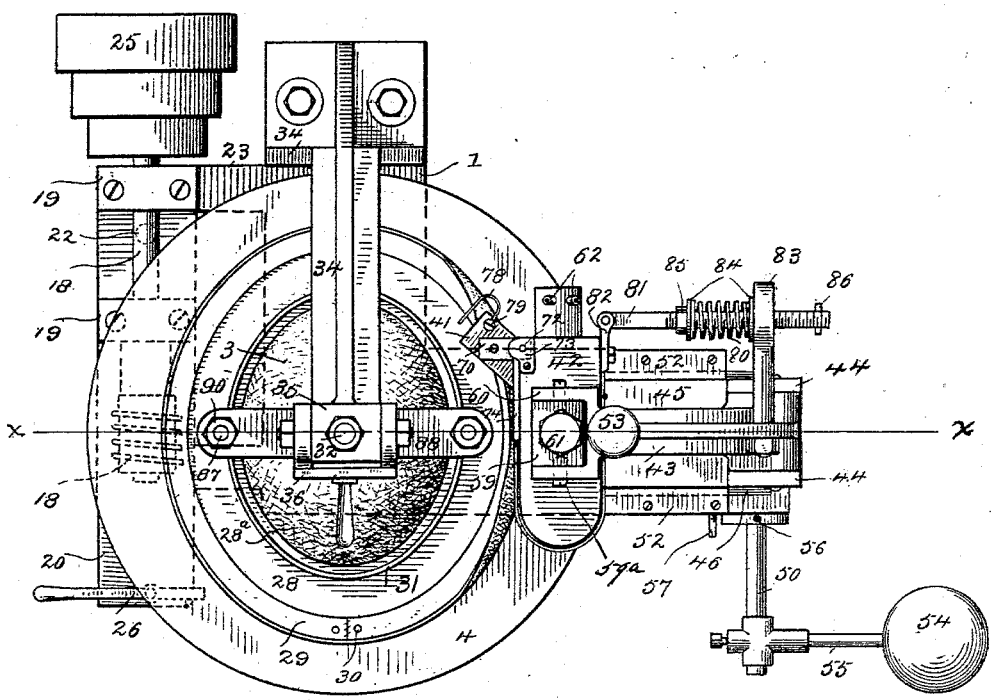
Figure 2:
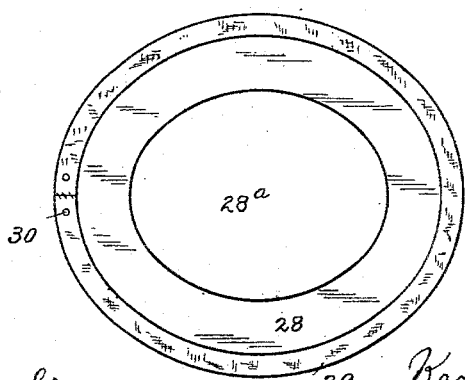
Figure 6:
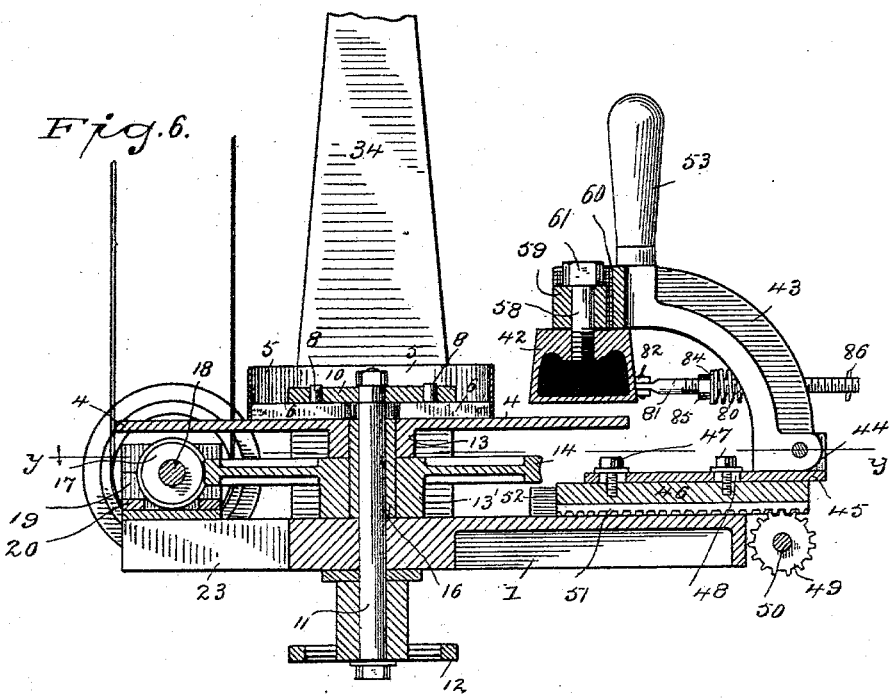
Figure 7:
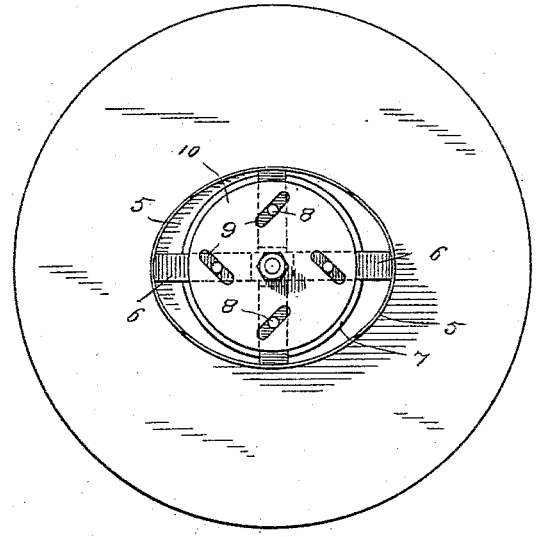
Figure 8:
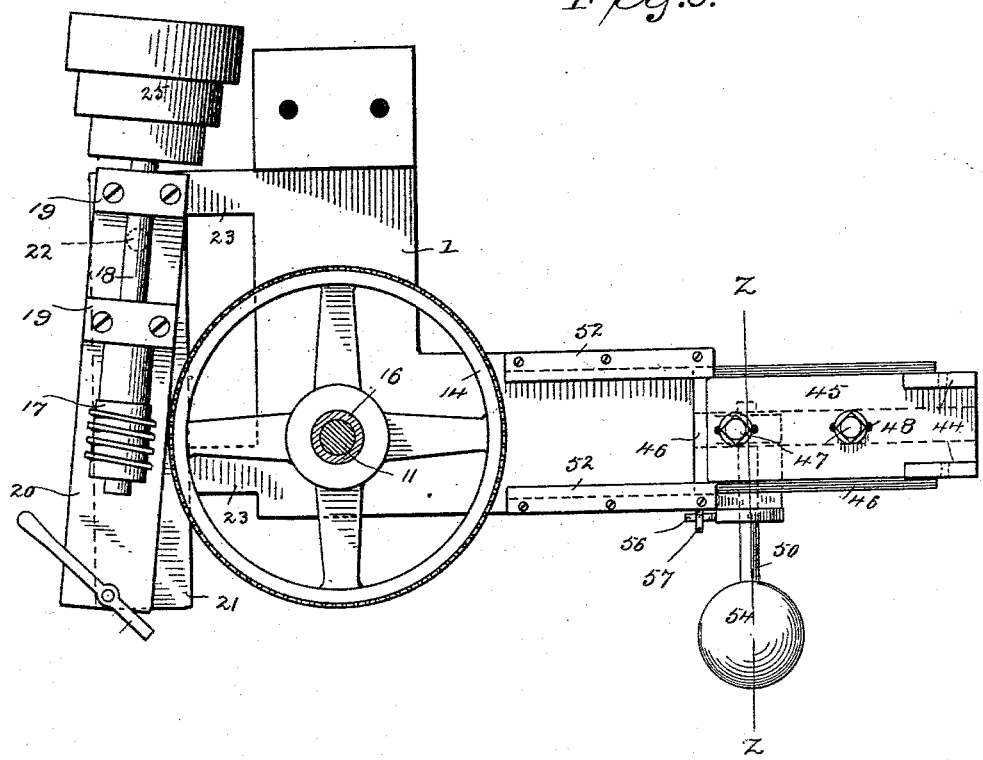
Figure 9:
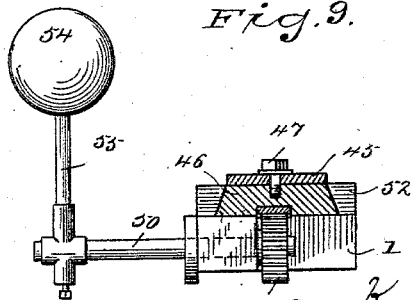
Figure 10:
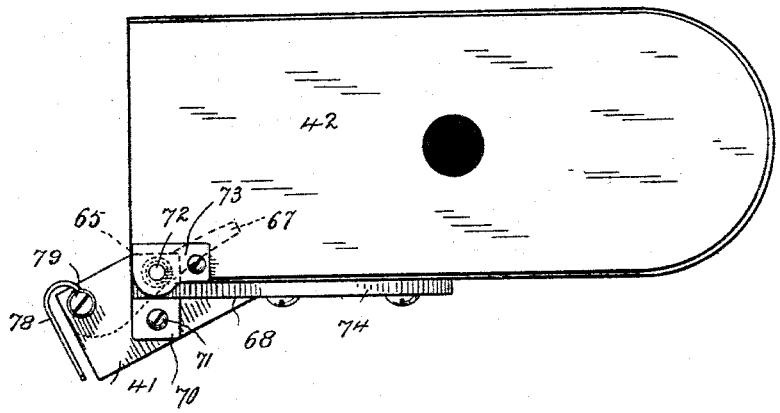
Figure 13:
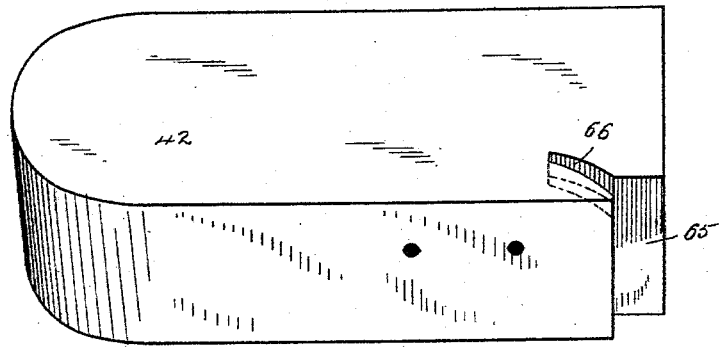
Figure 14:
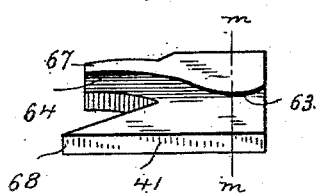
Figure 15:
Figure 16:
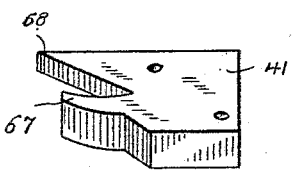
Figure 17:
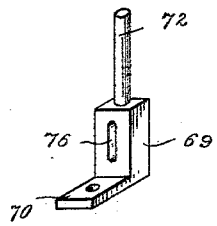

Figure 1 is a plan view of the machine complete; Fig. 2, a plan view of the curling-plate detached; Fig. 3, a side elevation, the hat, curling-plate, and holding-ring being in section; Fig. 4, a detail elevation as seen from the left in Fig. 3; Fig. 5, an end elevation as seen from the left in Fig. 3, the holding-ring being in the raised position; Fig. 6, substantially a section on the line $x$ $x$ in Fig. 1; Fig. 7, a plan view of the table and internal clamp for the hat; Fig. 8, a section on the line $y$ $y$ in Fig. 6, looking down; Fig. 9, a section on the line $z$ $z$ in Fig. 8. Fig. 10 is a plan view, Fig. 11, an elevation, and Fig. 12 an inverted plan view, of the curling-tool and pressing-iron; Fig. 13, a perspective of the pressing-iron detached; Fig. 14, an inverted perspective of the curling-tool detached; Fig. 15, a section of the curling-tool on the line $m$ $m$ in Fig. 14; Fig. 16, a perspective of the curling-tool detached, and Fig. 17 is a perspective of the sliding block detached.

1 denotes the bed of the machine, which is supported by a suitable standard 2. The hat to be operated upon, which we have designated by 3, rests upon a rotating table 4, upon which it is held by suitable mechanism which clamps the hat on its inner side. In the present instance we have shown clamping mechanism consisting of spring-plates 5, carried by radial arms 6, which slide in grooves in a plate 7, (see Fig. 7,) and are provided with pins 8, which engage oblique slots 9 in a disk 10 at the upper end of a shaft 11, which passes through the bed and is operated by a hand-wheel 12 on the under side thereof.

The table is provided on its under side with a hub 13, and below this hub is a worm-wheel 14, having a similar hub, (designated by 13'.) These hubs are both secured by set-screws 15 to a sleeve 16, which turns freely on shaft 11. (See Fig. 6.) Motion is imparted to the worm-wheel by means of a worm 17 on a shaft 18, journaled in boxes 19 on an oscillating plate 20, which is pivoted to a plate 21, as at 22, plate 21 being rigidly secured to arms 23, extending outward from the bed. Shaft 18 receives motion from a belt 24, running over a pulley 25 on said shaft, three belt-pulleys being shown in the present instance to provide for three speeds. Oscillating plate 20 is locked to plate 21 by means of a latch 26, which is pivoted to plate 20 and is provided with a downwardly-turned end 27, (see Fig. 3,) which engages the edge of plate 21 to lock the two plates in position and to lock the worm in engagement with the worm-wheel, as shown in Figs. 3 and 6.

In order to stop the motion of sleeve 16, which carries the parts supporting the hat to be operated upon, it is simply necessary to throw the latch out of engagement, as in Fig. 8, and to swing plate 20 outward far enough to disengage the worm from the worm-wheel, as clearly shown in Fig. 8, any shifting of the belt being wholly unnecessary.

When a hat is placed in the machine to be operated upon, the worm is disengaged from the worm-wheel, as in Fig. 8, and the internal clamp is contracted by means of hand-wheel 12. The operator then places the hat over the internal clamp and operates the hand-wheel to move radial arms 6 outward, the effect of which is to press the spring-plates 5 against the inner side of the hat, thereby securely fastening it in position. Having fastened the hat, the operator places over the brim a plate, which we term a "curling-plate" and designate by 28. This plate is provided with a central opening $28^a$, which is made oval to receive the crown of the hat, and is provided at its outer end with a yielding binding 29, preferably of leather, over which the edge of the hat-brim is curled. This binding is preferably made in a single piece, the ends of which are stitched together and are attached firmly and smoothly to the curling-plate by rivets 30. These plates are stamped out from sheet metal and are quite inexpensive. In practice for convenience we use a number of them at a time, removing them from the machine with the curled hats.

The use of a yielding binding upon the curling-plates insures that the curl will lie down flat without corrugating and will not rise up as soon as the iron leaves it in the operation of binding.

It will of course be apparent that the sizes of the plates, more especially the sizes of the internal openings, must be changed to correspond with different sizes of hats, as the crowns should fit the openings closely, and, furthermore, that the plates require to be changed whenever the style of brim is changed. The curling-plate is removed from the curled hat by simply springing the brim sufficiently to permit the plate to be lifted out, the brim at once returning to its proper position.

The curling-plate in use lies upon the brim of the hat and is held in position by means of a holding-ring 31, which is swiveled at the lower end of a rod 32, itself adapted to move vertically in a head 33 on a standard 34, which extends upward from the bed, to which it is rigidly bolted. At the upper end of rod 32 is a block 35, to which is pivoted a double latch 36, which is adapted to engage pins 37 on opposite sides of the head and is provided with a handle for convenience in operation. The rod, holding-ring, &c., are counterbalanced by means of a weight 38, a cord 39 extending from said weight over a pulley, (not shown,) and being connected to a loop 40 on the block.

In Fig. 5 the holding-ring, rod, &c., are shown in the raised position, and in Fig. 3 the holding-ring is shown as lowered upon a curling-plate and locked in position by engagement of the double latch with pins 37. (See also Fig. 4.)

It will be apparent that the holding-ring does not require to be changed in use. The only portion of the machine requiring to be changed in changing from one style or size of hat to another is the curling-plate. In the present instance we have shown the holding-ring as connected to rod 32 by means of arms 87, which are rigidly secured to the ring and extend upward therefrom. The upper ends of the arms are threaded and pass through a cross-piece 88, which rests upon a head 89 at the lower end of the rod and turns freely thereon. The arms are secured to the cross-piece by nuts 90.

41 denotes the curling-tool which, is secured to the pressing-iron 42 in such a manner as to have vertical movement independently of the iron, the pressing-iron itself being secured to a swinging arm 43 in such a manner as to permit it to oscillate both in the horizontal and vertical planes, as we shall presently describe more in detail. Swinging arm 43 is pivoted between ears 44 on a plate 45, which is secured to a slide 46 by means of bolts 47, which pass through slots 48 in plate 45 and engage the slide, this mode of attachment being for the purpose of permitting adjustment of plate 45, the swinging arm, pressing-iron, curling-tool, &c., independently of the slide, as is of course sometimes necessary in changing from one style or size of hat to another, said arm 43 and the parts carried thereby being capable of swinging in the vertical plane, so as to place the curling-tool, pressing-iron, &c., out of operative position, and to permit the operative surface of the iron to be cleaned conveniently. This construction will be clearly understood from Fig. 3, in which the position of said parts when thrown out of the way is clearly indicated by dotted lines. The swinging arm is provided with a handle 53 for convenience in operation, and its shape is such that a surface of the arm itself engages plate 45, serving as a stop to limit its movement in both directions. In practice in placing hats in the machine and removing them therefrom the slide, swinging arm, curling-tool, and pressing-iron are moved back out of the way by means of a pinion 49 on a shaft 50, which is journaled in the bed, said pinion engaging a rack 51 on the under side of the slide.

52 denotes ways upon the bed, in which the slide is adapted to reciprocate.

The slide, swinging arm, curling-tool, pressing-iron, &c., are by preference partially counterbalanced by a weight 54 on a crank-arm 55, extending outward from shaft 50. In practice we so graduate or adjust weight 54 that the weight of arm 43, the curling-tool, pressing-iron, &c., will act to retain said parts in operative position, but very slight pressure, however, being required upon weight 54 to move said parts backward out of operative position, the backward movement of the slide being checked by engagement of a stop 56 on shaft 50 with a stop 57 on the bed. (See Fig. 8.)

The pressing-iron is connected to swinging arm 43 in such a manner as to be free to oscillate both in the vertical and horizontal planes, as will be clearly understood from Figs. 1 and 6.

58 is a bolt, which passes through a block 59, so as to turn freely therein. The lower end of the bolt is threaded to engage the pressing-iron, and the upper end is provided with a head 61, which rests upon the block, thereby holding the pressing-iron and with it the curling-tool in position. The block is pivoted in a yoke 60 at the upper end of the swinging arm, as at 59ª, (see Fig. 1,) so as to oscillate in the vertical plane.

From the above it will be understood that oscillation of the pressing-iron and with it the curling-tool in the horizontal plane is obtained by oscillation of bolt 58 in the block, and that oscillation of said parts in the vertical plane is obtained by oscillation of the block in the yoke.

The pressing-iron may be heated in any suitable manner, as by slugs or by gas. 62 (see Fig. 1) denotes hubs at the rear end of the pressing-iron for the attachment of gas and air pipes.

Figure 11:
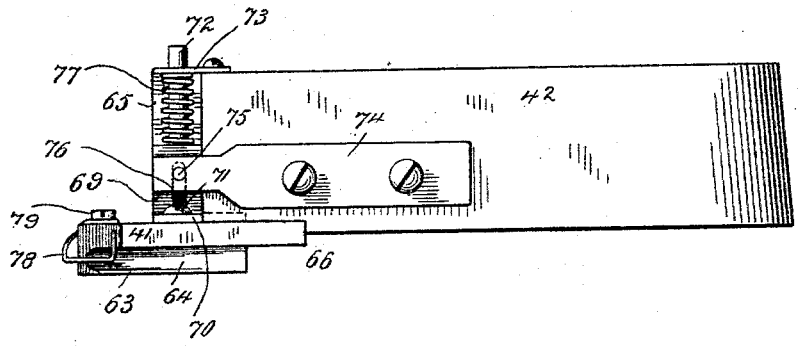
Figure 12:
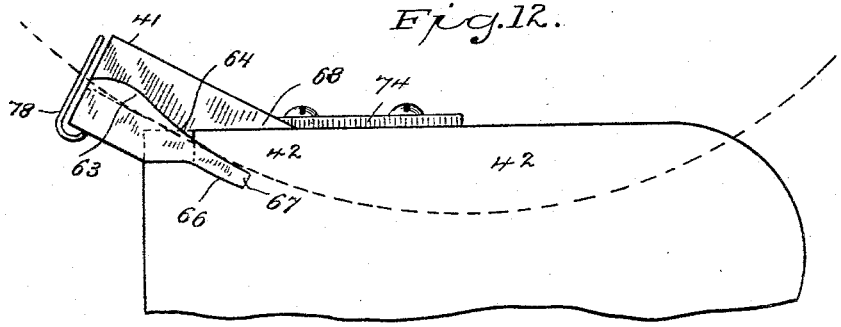

The construction of the curling-tool and the mode of its attachment to the pressing-iron will be understood from Figs. 10, 11, and 12 in connection with the general views.

One side of the curling-tool upon its under side is cut away in such a manner as to leave a thin lip 63, which passes under the brim of the hat and starts the curl into the curling-groove 64, by which it is turned over ready to be pressed and set by the heated pressing-iron.

65 denotes a recess in one corner of the pressing-iron, the purpose of which will presently be apparent, and 66 a recess in the under side thereof, which receives a toe 67, projecting outward from the curling-tool.

The exact shape of the body of the curling-tool and the special planes of the surfaces which bear against the body of the pressing-iron are of course not of the essence of our invention. The configuration of the parts illustrated in the drawings, while by no means essential, is one that we employ in daily use and find perfectly satisfactory in every respect.

In order to give ample strength to meet any possible requirements in use, we have provided the curling-tool with a surface 68, which bears in the direction of the greatest strain upon the side of the pressing-iron. (See Figs. 10 and 12.) The curling-tool is carried by a block 69, which is adapted to move vertically in recess 65 in the pressing-iron. At the lower end of block 69 is a plate 70. The curling-tool is secured to the block by means of a screw 71, which passes through plate 70 and engages the block. Extending upward from block 69 is a rod 72, which passes through a guide-plate 73 at the top of the pressing-iron. The block, curling-tool, &c., are additionally held in place by a plate 74, secured to the side of the pressing-iron, and which is provided with a pin 75, which extends inward and engages a groove 76 in the side of the block, (see Fig. 11,) thereby retaining the block, curling-tool, &c., securely in place, but permitting free vertical movement thereof. The curling-tool is pressed down upon the hat-brim in use by means of a spring 77, which bears upon the top of the block and against guide-plate 73. Toe 67, which lies in recess 66 in the bottom of the pressing-iron, also serves to guide and steady the curling-tool.

It will be seen from Fig. 11 that when not in use spring 77 will act to press the curling-tool down below the plane of the pressing-iron. In use, however, spring 77 yields until the top of the toe lies in contact with the bottom of recess 66, at which instant the upper, i. e., the horizontal, wall of curling-groove 64 will be in the same plane with the under side of the pressing-iron. In addition to serving to guide the curling-tool itself toe 67 serves as a guide for the curled edge of the hat-brim to prevent the curl from running out at the instant that it begins to pass under the pressing-iron, as will be understood from Fig. 12, which is an inverted plan view, the hat-brim being indicated by a dotted line.

78 denotes a guide, which is secured to the curling-tool by means of a screw 79. This guide is made of wire and is curved outward, then inward in front of the curling-tool, the end being preferably turned upward, as shown in Fig. 11, in such a manner as to guide the brim into the curling-groove at the instant the curl is started. This guide in fact renders it impossible for the curl, when once started, to run out, but insures that the edge of the brim as it passes into the curling-tool will be uniformly turned thereby, after which it will be pressed down and set in shape by the pressing-iron.

As already described, the pressing-iron and curling-tool oscillate both in the horizontal and vertical planes. In use the curling-tool and pressing-iron are constantly retained in operative position and caused to adjust themselves to the oval of the hat-brim, shifting automatically, as is required, by the constantly-changing curvature of the hat-brim at the ends, sides, and quarters by means of a spring 80, which surrounds a rod 81. (See Figs. 1 and 6.) One end of this rod is hinged to the pressing-iron or to an arm 82, extending outward therefrom and passes freely through an arm 83, which extends outward from swinging arm 43. (See Fig. 1.) The ends of spring 80 bear against washers 84, one of which rests against arm 83, the other against a nut 85 on rod 81, said rod being threaded so as to permit ample adjustment of the nut to regulate the tension of the spring.

86 denotes a stop on rod 81, for example, a pin driven through the rod, which prevents spring 80 from throwing the pressing-iron around far enough when not in use to disengage rod 81 from arm 83.

It will be seen in Fig. 1 that the action of spring 80 is to hold the curling-tool firmly against the curled edge of the brim, the long radii of the oval acting to swing the pressing-iron outward against the power of the spring, and the spring acting instantly again to hold the tool inward in close contact with the brim at the quarters and sides, i. e., the short radii of the oval.

Having thus described our invention, we claim—

1. The combination with the removable curling-plate the holding-ring and rod 32 to which it is swiveled, of block 35 at the upper end of the rod, latch 36 pivoted thereto, and head 33 through which the rod passes and which is provided with pins 37 which are engaged by the latch to lock the holding-ring in operative position.

2. The combination with standard 34 and head 33 having pins 37, of the removable curling-plate the holding-ring, rod 32 to which it is swiveled and which passes through the head, block 35 at the upper end of the rod, a weight connected to the block by which the parts are counterbalanced, and a latch pivoted to the block and engaging pins 37 whereby the ring is locked in operative position.

3. The combination with the removable curling-plate, the holding-ring having arms 87, and the cross-piece to which said arms are connected, of rod 32 to which the cross-piece is swiveled a block at the upper end of said rod carrying a latch, a head 33 through which the rod passes and which is provided with pins 37 adapted to be engaged by the latch to lock the parts in operative position.

4. The curling-tool having lip 63, a curling-groove 64, and a guide which is curved downward and then inward in front of said tool so as to guide the brim into the groove at the instant the curl is started.

5. The combination with the pressing-iron having recesses 65 and 66 of block 69 adapted to move in recess 65, and the curling-tool secured to said block and provided with a toe 67 which engages recess 66.

6. The combination with the pressing-iron having recesses 65 and 66, of block 69 adapted to move in recess 65, the curling-tool secured in said block and provided with a toe 67 which engages recess 66, and spring 77 which bears upon the block and acts to hold the curling-tool down in use.

7. The combination with the pressing-iron having recess 65, of block 69 adapted to move in recess 65 and having a rod 72 extending upward therefrom, guide-plate 73 through which said rod passes, the curling-tool secured to said block, a spring 77 which bears upon the block and guide-plate to hold the block and curling-tool down in use.

8. The combination with the pressing-iron having recess 65, of block 69 having groove 76, the curling-tool secured to said block, spring 77 acting to hold the block and curling-tool downward and plate 74 having pin 75 engaging groove 76 as and for the purpose set forth.

9. The combination with yoke 60, the pressing-iron and intermediate connections which permit said iron to oscillate in the vertical and horizontal planes, of a slide to which the yoke is connected and which is provided with a rack, shaft 50 carrying a pinion engaging said rack and a crank-arm carrying a weight, and a suitable stop to limit the backward movement of the slide.

10. The combination with the rotating table, the curling-plate and the holding-ring, of the pressing-iron, the curling-tool carried thereby and having independent vertical movement, yoke 60 and a support therefor, and connections intermediate said yoke and pressing-iron which permit the latter to oscillate in both the vertical and horizontal planes.

11. The combination with the rotating table, the curling-plate and the holding-ring, of the pressing-iron, the curling-tool carried thereby and having independent vertical movement, the slide, arm 43, and suitable means for pivotally connecting the pressing-iron and said arm.

12. The combination with the rotating table, the curling-plate and the holding-ring, of the pressing-iron, the curling-tool carried thereby and having independent vertical movement, arm 43 to which the pressing-iron is pivotally connected, arm 83 extending from arm 43, rod 81 connected to the pressing-iron and passing through arm 83, and spring 80 bearing against arm 83 and acting to hold the curling-tool and pressing-iron in contact with the hat-brim the spring yielding when the long diameter of the curling-plate comes into operative position.

13. The combination with the rotating table, the curling-plate and the holding-ring, of the pressing-iron, the curling-tool carried thereby, arm 43 to which the pressing-iron is pivotally connected, arm 83 extending therefrom, rod 81 connected to the pressing-iron and passing through said arm, a spring bearing against said arm and acting to hold the curling-tool and pressing-iron in contact with the hat-brim, and a pin 86 passing through said rod to retain the parts in place.

14. The combination with curling-plate 28 having an opening 28ᵃ to receive the crown of a hat and a yielding binding 29 over which the edge of the brim is curled, of holding-ring 31, rod 32 to which it is swiveled, a head 33 through which the rod passes means for supporting the head and means for locking the rod to the head to retain the curling-plate in operative position.

In testimony whereof we affix our signatures in presence of two witnesses.

KEROS LESTER COMES.
SAMUEL T. NEWMAN.

Witnesses:
EUGENE C. DEMPSEY,
JOHN R. BOOTH.